United States Patent [19]
Nonogaki

[11] Patent Number: 5,705,108
[45] Date of Patent: Jan. 6, 1998

[54] METHOD FOR MAKING EDGE FOR LOUDSPEAKER DIAPHRAGM

[75] Inventor: Akihiro Nonogaki, Akishima, Japan

[73] Assignee: Foster Electric Co., Ltd., Tokyo, Japan

[21] Appl. No.: 670,422

[22] Filed: Jun. 26, 1996

[30] Foreign Application Priority Data

Oct. 3, 1996 [JP] Japan .................... 7-282439

[51] Int. Cl.⁶ .................. B29C 44/06; B29C 44/12
[52] U.S. Cl. .................. 264/46.4; 264/46.9; 264/54; 264/252
[58] Field of Search .................. 264/54, 252, 46.4, 264/46.9

[56] References Cited

U.S. PATENT DOCUMENTS

| | | | |
|---|---|---|---|
| 3,935,924 | 2/1976 | Nagao et al. | 181/169 |
| 4,147,229 | 4/1979 | Flashman | 181/144 |
| 5,047,191 | 9/1991 | Baitcher et al. | 264/252 |
| 5,099,949 | 3/1992 | Mitobe | 181/171 |
| 5,111,510 | 5/1992 | Mitobe | 381/193 |
| 5,319,718 | 6/1994 | Yocum | 381/193 |
| 5,578,800 | 11/1996 | Kijima | 181/171 |
| 5,599,563 | 2/1997 | Yocum | 425/812 |

*Primary Examiner*—Allan R. Kuhns
*Attorney, Agent, or Firm*—Leydig, Voit & Mayer, Ltd.

[57] ABSTRACT

An edge for loudspeaker diaphragm is made by disposing a diaphragm one of a pair of mating molds, disposing a strip-shaped base material of the edge on the said one of the molds, and hot-molding them with the other mold mated with the one mold. Foaming action of the base material occurs, and an eventual foamed edge is integralized with the diaphragm.

6 Claims, 3 Drawing Sheets

METHOD FOR MAKING EDGE FOR LOUDSPEAKER DIAPHRAGM

BACKGROUND OF THE INVENTION

This invention relates to a method for making an edge for a loudspeaker diaphragm and, more particularly, to the method for making the edges for use with loudspeaker diaphragms without requiring any separate step of adhering the edge to the diaphragm and without causing remarkable deformation.

DESCRIPTION OF RELATED ART

Enumerable conditions required for loudspeaker diaphragm edges include excellent linearity with respect to input signals, difficulty in causing reverse resonance phenomenon, assurable reliability, lightweight properties, easy and inexpensive manufacturability, and so on.

In order to satisfy these conditions, with respect to the structure, there has been suggested a fixed edge type or a free edge type.

In the former fixed edge type, the diaphragm and edge can be integralized through a molding, whereas there has been a problem that the ideal function of the edge as in the above is rendered difficult to attain because the material of the diaphragm of a relatively high elastic modulus is employed for the edge.

In the latter free edge type, the diaphragm and edge are separately molded so that the ideal function of the edge can be easily realized, whereas a problem arises in that adhering the edge to the diaphragm requires an increased number of manufacturing steps.

In order to improve the method in these respects, recently, there has been suggested a method in which the diaphragm and edge are simultaneously molded and adhered to each other mainly through an injection molding, as has been described in, for example, European Patent No. 492,914 and U.S. Pat. Nos. 5,099,949 and 5,111,510.

According to this known method for simultaneously molding and adhering the diaphragm and edge utilizing the injection molding, however, there has been a problem. Due to the use of such all solid structural members as various valcanized rubbers, thermoplastic elastomers and the like, a residual stress mainly with respect to a contraction occurring in the edge after being molded together with and adhered to the diaphragm cannot be released well so as to result in a remarkable deformation.

In order to eliminate this problem, U.S. Pat. No. 5,319,718 has suggested integrating the edge with the diaphragm simultaneously upon pressure-molding of the edge with a liquefied foaming plastic supplied to a cavity zone for the edge in the molds.

The above integral molding of the diaphragm and edge of U.S. Pat. No. 5,319,718 has problems such that the molding means, installation and steps require a large size scale thereby rendering the method complicated and manufacturing costs to be high, and that the foaming material has been defective in being deteriorated due to hydrolysis in the case of esters or due to ultraviolet rays in the case of ethers, so that the edge will be remarkably lowered in strength and expansion within several years.

SUMMARY OF THE INVENTION

A primary object of the present invention is to overcome the foregoing problems, and to provide a method for making the edge for a loudspeaker diaphragm, allowing the edge and diaphragm to be adhered to each other simultaneous with the molding of the edge without causing any deformation of the edge afterwards, and maintaining initial characteristics for a long term to be highly reliable.

According to the method for making the edge for a loudspeaker diaphragm of the present invention, the above object can be realized by such features that as a preliminarily made diaphragm being disposed in one of a pair of mating molds, and a base material for the edge consisting of a mixture of a rubber as a main composition with a foaming agent being hot-molded into a predetermined edge shape with the other mold of the mating molds mated with said one mold to have a thus hot-molded, foamed edge integralized with the diaphragm.

It is one of the features to employ the vulcanized rubber, thermoplastic elastomer or the like as rubber forming the main component of the base material for the edge, which rubber is selected from the group consisting of styrene-butadiene rubber, nitrile butadiene rubber, ethylene-propylene-polymer rubber, isoprene rubber, chloroprene rubber, isobutylene-isoprene rubber, ethylene propylene rubber and silicone rubber, while the thermoplastic elastomer can be selected from the group consisting of polystyrenes, polyolefins, polyurethanes, polyesters, polyamides, polybutadienes, ethylene-vinyl acetates and polyvinyl chlorides.

Other objects and advantages of the present invention shall become clear as the description advances in the following discussion with reference to preferred embodiments shown in the accompanying drawings.

Figure 1A:
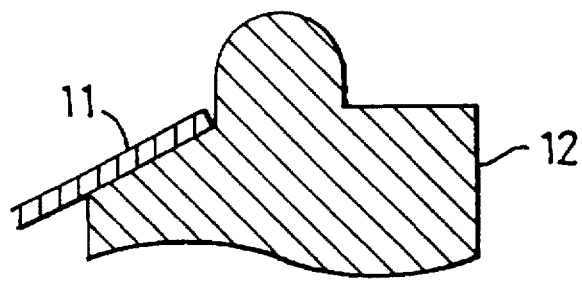
FIGS. 1(a) through 1(d) are schematic, fragmentary sectioned views showing the steps of the method in an embodiment according to the present invention.

While the present invention shall now be described with reference to the preferred embodiments shown in the drawings, it should be appreciated that the intention is not to limit the invention only to the embodiments shown but rather to include all alterations, modifications and equivalent arrangements possible within the scope of appended claims.

DETAILED DESCRIPTION OF THE PREFERRED EMBODIMENTS

Figure 1B:
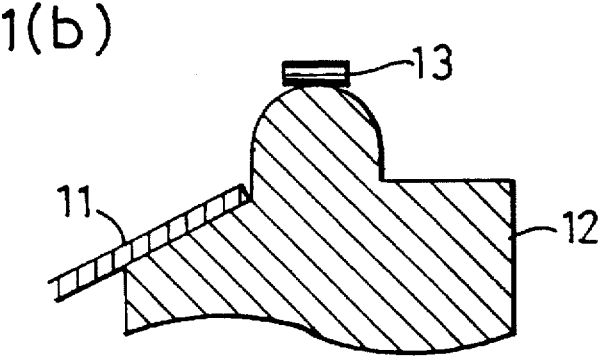
Figure 1C:
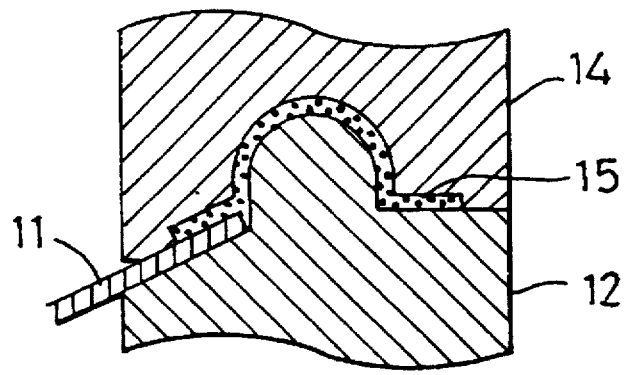
Figure 1D:
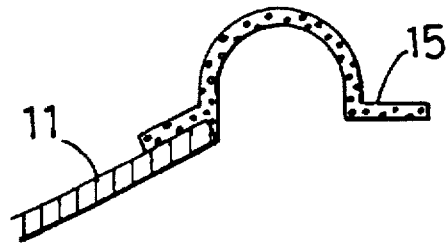

In FIGS. 1(a) to 1(d), there are shown the manufacturing steps in an embodiment according to the present invention, in which embodiment a paper-made diaphragm 11 preliminarily obtained through a wet paper making process is first placed at peripheral part on a mold 12 of a pair of mating molds, as shown in FIG. 1(a). Next, as shown in FIG. 1(b), a strip-shaped base material 13 of the edge is placed on the one mold 12. Then, as shown in FIG. 1(c), the other mold 14 of the mating molds is mated with the one mold 12 and pressed thereto as heated. At this time, the molds were heated to 205° C. and pressed for 40 seconds. With the base material 13 for the edge of a synthetic rubber unvulcanized, the viscosity of the material heated was lowered to start running, the foaming of the material advanced in well balanced state simultaneously with the vulcanization caused to occur as heated, and a foamed edge 15 thus provided was integralized with the diaphragm 11 with a self-adherence of the material. When the adherence is insufficient due to a use of another material, (e.g., an adhesive) should preferably be applied preliminarily to the diaphragm 11. Next, as shown in FIG. 1(d), the integralized diaphragm 11 and foamed edge 15 are released from the molds.

According to the method of making as described in the above in which the base material 13 for the edge is hot-molded into a predetermined edge shape by means of the one and the other molds 12 and 14 and the foamed edge 15 is adhered to the diaphragm 11 simultaneously with the molding, the edge is made of the foamed member, so that the relaxation of the residual stress can take place in each cell of cell-structure of the foamed member and no remarkable deformation is caused to occur as a whole.

For the adhering aspect between the diaphragm and the foamed edge, any other arrangement than the above of FIG. 1 is also employable.

Figure 2:
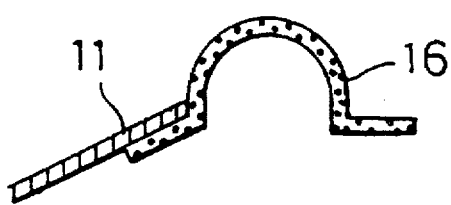
FIG. 2 is a diagram showing the shape of the foamed edge according to the embodiment of FIG. 1.
Figure 3:
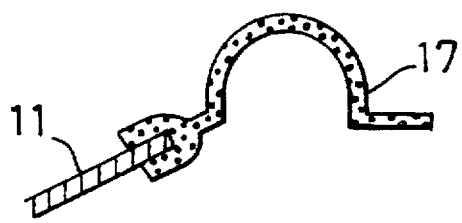
FIG. 3 is a diagram showing a shape of the foamed edge according to another embodiment of the present invention.

In FIGS. 2 and 3, there are shown other aspects of the foamed edge in other embodiments, according to the present invention. In the aspect of FIG. 2, an adhering part between the diaphragm 11 and the foamed edge 16 is formed by overlapping the diaphragm 11 on the foamed edge 16. In the aspect of FIG. 3, an inner end of the foamed edge 17 is bifurcated in the sectional view to form the adhering part, and the diaphragm 11 is held by the bifurcated end of the edge 17.

Figure 4:
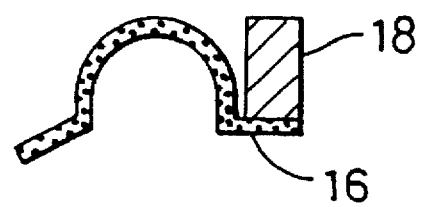
FIG. 4 is a diagram showing a shape of the foamed edge according to another embodiment of the present invention.
Figure 5:
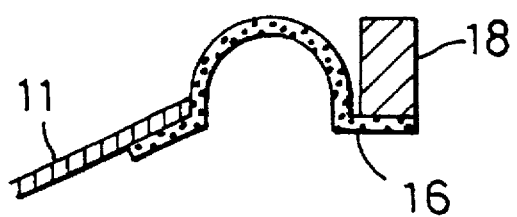
FIG. 5 is a diagram showing a shape of the foamed edge according to still another embodiment of the present invention.

It is also possible to employ an aspect in which, not only the foamed edge and diaphragm, but a gasket is also adhered to the foamed edge or to the foamed edge and diaphragm, at the time of molding the edge. In FIG. 4, there is shown an aspect in which a gasket 18 is adhered to the foamed edge 16, while in FIG. 5 an aspect in which the foamed edge 16, diaphragm 11 and gasket 18 are adhered is shown.

Figure 6A:
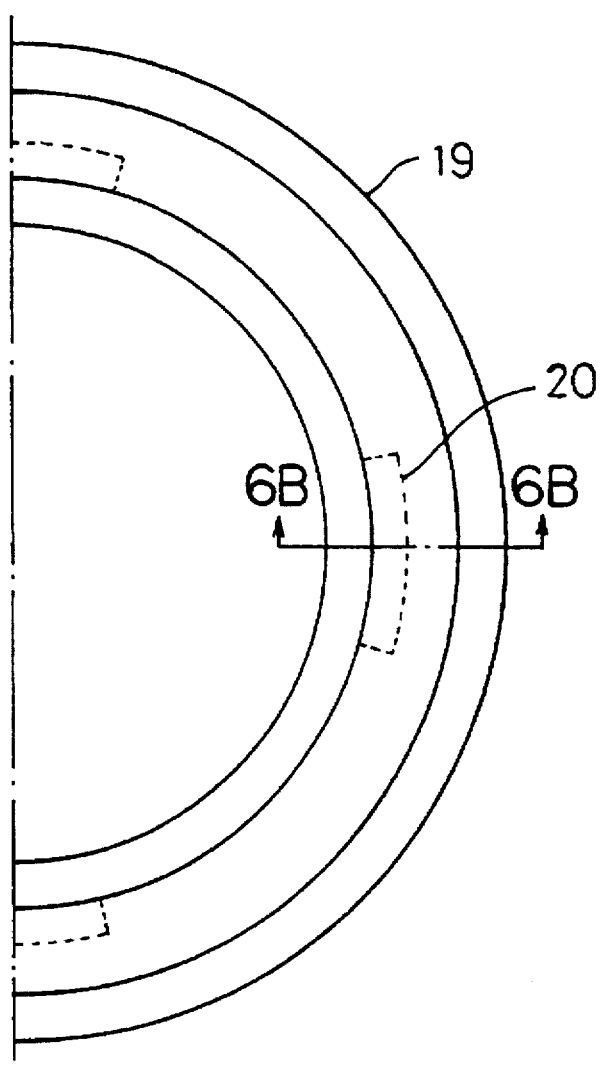
FIG. 6(a) shows in a plan view a half of the foamed edge according to another embodiment of the present invention.
Figure 6B:
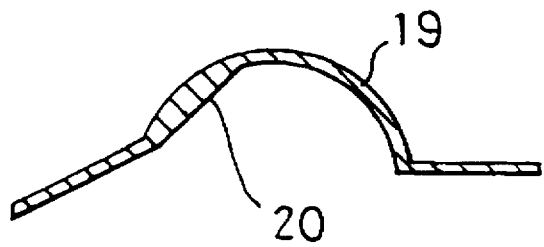
FIG. 6(b) is a fragmentary sectioned view as magnified of the edge of FIG. 6(a) taken along A—A line.

In another embodiment according to the present invention, further, a foamed edge having an edge damping means as shown in FIG. 6 is employed. That is, as will be clear from the plan view of FIG. 6(a) and the 6B—6B line sectioned view of FIG. 6(b), the foamed edge 19 is provided at four radial, circumferentially separated positions with edge damping parts 20 made integral with the foamed edge 19. In the case of a loudspeaker employing such foamed edge 19 provided with the edge damping parts 20 at the circumferentially separated positions, an excellent normal of acoustic image is kept optimum at the time when a second of the loudspeaker is deviated from central axis of the loudspeaker, that is, when the sound is out of the optimum listening point. That is, in the case of a stereophonic sound reproduction with the loudspeakers employing the foamed edge 19 of the present embodiment, a sufficient stereophonic effect can be attained even at positions more or less deviated from the central position in the speaker diaphragm according to the present embodiment.

In the respective embodiments of FIGS. 2 through 6, any deformation of the edge can be restrained in similar manner to the embodiment of FIG. 1, by simultaneously molding the edge, integralizing the diaphragm and edge simultaneously with the molding, and causing the edge to foam. In the case of the injection molding, the deformation of edge can be excellently controlled by integralizing the diaphragm and edge, and causing the edge to foam.

While a foaming agent is employed for causing the edge to foam in the respective foregoing embodiments, any gas-forming agent relying on thermal decomposition may be employed as the foaming agent. On the other hand, the foamed edge should optimally be of a specific gravity in a range of 0.07 to 1.2.

What is claimed is:

1. A method for making an edge for a loudspeaker diaphragm, comprising:

disposing a premanufactured diaphragm on one of a pair of mating molds respectively including male and female edge-forming portions that form a predetermined edge shape upon mating, disposing a strip-shaped base material comprising a mixture of rubber as a main component and a foaming agent on the edge-forming portion of one of said mating molds, and mating said pair of molds to hot-mold said strip-shaped base material into a foamed edge with said predetermined edge shape and simultaneously integrating said foamed edge with said diaphragm.

2. The method according to claim 1, wherein said rubber is selected from the group consisting of vulcanized rubber and thermoplastic elastomer.

3. The method according to claim 2, wherein said thermoplastic elastomer is selected from the group consisting of polystyrenes, polyolefins, polyurethanes, polyesters, polyamides, polybutadienes, ethylene-vinyl acetates, and polyvinyl chlorides.

4. The method of claim 1 further comprising adhering a gasket to the foamed edge.

5. The method of claim 1, wherein said foamed edge comprises a damping structure.

6. The method of claim 1, wherein said foamed edge comprises circumferentially separated damping structures.

* * * * *